United States Patent [19]
Hatke

[11] 3,763,852
[45] Oct. 9, 1973

[54] HEARTBEAT RATE MEASURING APPARATUS

[75] Inventor: Fred Louis Hatke, Skillman, N.J.

[73] Assignee: Hoffmann-La Roche Inc., Nutley, N.J.

[22] Filed: Dec. 8, 1971

[21] Appl. No.: 205,948

[52] U.S. Cl. ........ 128/2.05 T, 128/2.05 Z, 307/233, 324/78 E
[51] Int. Cl. ............................................. A61b 5/02
[58] Field of Search ................. 128/2.05 P, 2.05 Q, 128/2.05 R, 2.05 S, 2.05 T, 2.05 Z, 2.06 A, 2.06 F, 2.06 G, 2.06 R; 324/78 E, 78 J, 78 Z; 307/233; 328/104, 106, 116, 141

[56] References Cited
UNITED STATES PATENTS

| | | | |
|---|---|---|---|
| 3,518,983 | 7/1970 | Jorgensen | 128/2.06 A |
| 3,171,892 | 3/1965 | Pantle | 128/2.05 R X |
| 2,815,748 | 12/1957 | Boucke | 128/2.05 T |
| 2,536,527 | 1/1951 | Appel | 128/2.05 P |
| 3,209,251 | 9/1965 | Edgington et al. | 128/2.05 T |
| 3,561,430 | 2/1971 | Filler, Jr. et al. | 128/2.05 T |

OTHER PUBLICATIONS

Satomuva, "Journal of the Acoustical Society of America," V. 29, No. 11, Nov., 1957, pp. 1181–1184.

Primary Examiner—William E. Kamm
Attorney—Samuel L. Welt et al.

[57] ABSTRACT

Apparatus for determining the heartbeat rate of a patient comprising deriving electrical signals representative of heartbeat activity. The signals are converted by a function generator into a value indicative of heartbeat activity on a beat-to-beat basis, and, at least three successive ones of the values are compared by a pair of credence checkers having a preselected frequency tolerance. The values lying outside the tolerance are rejected. Passed values are averaged and displayed and a visible indication denotes occurrence of a non-passed value.

6 Claims, 4 Drawing Figures

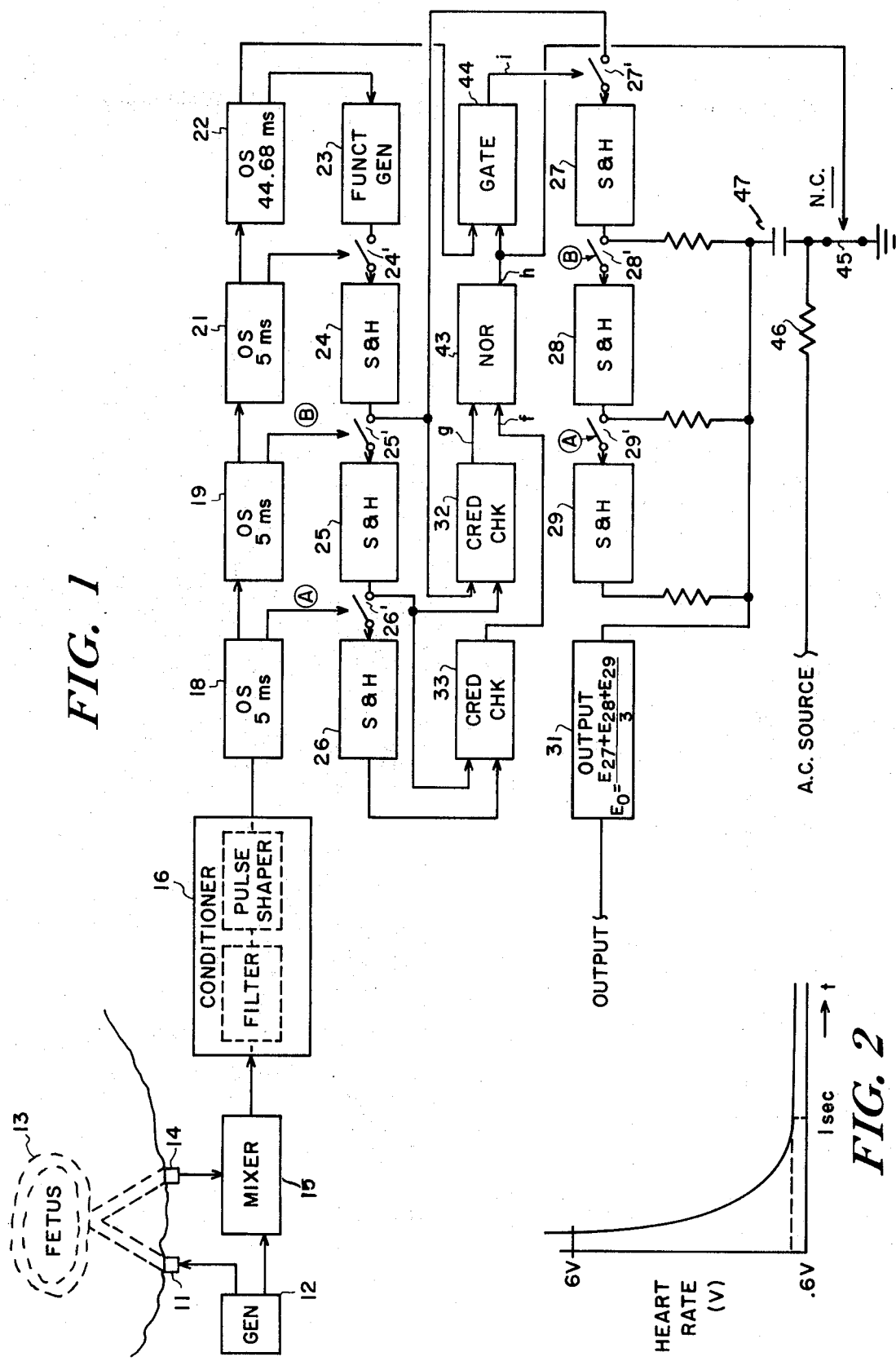

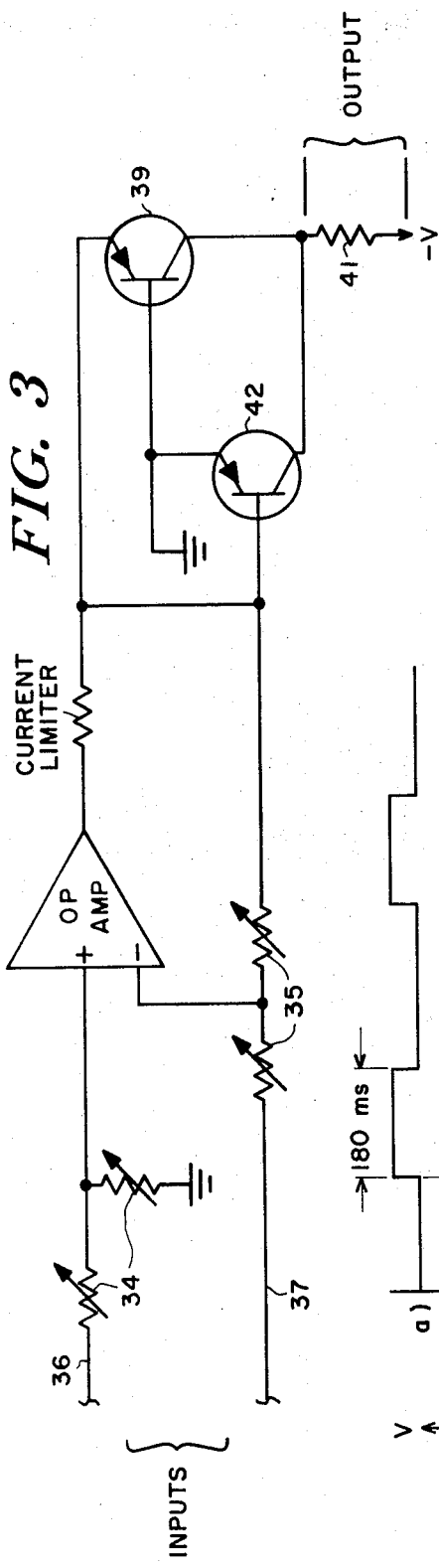

HEARTBEAT RATE MEASURING APPARATUS

BACKGROUND OF THE INVENTION

The present invention relates generally to electrical signal processing techniques for accurately ascertaining the heartbeat frequency of a patient for monitoring purposes.

In the field of heart rate monitoring, numerous problems are incurred in providing an accurate heart rate for the reason that electrical impulses indicative of noise or multiple heart signals within a single heartbeat may be erroneously judged as part of the heart rate count. In certain applications, i.e., in detecting and analyzing a fetal heartbeat, signals are often generated as a result of the disturbances introduced by the changing fetal positions and mother movements including pressure changes caused by labor, to frequently produce two or even three signals per fetal heartbeat. The latter is even more likely to occur when ultrasound is utilized as the vehicle for monitoring the heart rate, for the reason that the reflections of the ultra-sound might occur in response to not only movement of the front and back wall of the heart but in response to the heart valves and other motions about the fetal site.

As a consequence of these problems, errors are often introduced in the counting of the heart signals and/or sounds, and might lead to an incorrect diagnosis giving rise to needless emergency measures in some instances or obscuring the need for emergency measures in other instances.

SUMMARY OF THE INVENTION

Accordingly, it is the purpose of the present invention to avoid such problems as those noted above by provision of an electrical signal processing technique that evaluates or analyzes with a predetermined criteria at least three successive heart sounds and based on preselected critera ascertains the validity of each heart activity signal and ignores those signals rejected.

DESCRIPTION OF THE DRAWINGS

FIG. 1 is a block diagram of a scanning system in which the present invention is employed.

FIG. 2 is a voltage versus time graphic representation of the nonlinear hyperbolic signal generated by the function generator 23, shown in FIG. 1.

FIG. 3 is a schematic diagram of the credence checker 32 or 33 illustrated in FIG. 1.

FIG. 4 is a waveform diagram showing the operation on a certain input signal to the system shown in FIG. 1.

DESCRIPTION OF THE PREFERRED EMBODIMENT

Referring to FIG. 1, there is shown a transmitting transducer 11 driven by generator 12 for transmitting ultrasonic energy to a fetus, roughly illustrated as 13, within the maternal abdomen. The ultrasonic energy transmitted to the body may be of the pulsed wave or continuous wave type. Although an ultrasonic system is illustrated at the front end, it is readily understood that the present invention can be similarly employed with phonocardiographic or electrocardiographic techniques. A receiving transducer 14, adapted for deriving electrical impulse signals responds to the ultrasonic signals returned from the fetus 13. The receiving transducer 14 is connected to a mixer 15. Mixer 15 which is also connected from generator 12, amplifies the incoming signals and mixes them to provide a resultant Doppler signal output.

As was previously discussed, the output of the mixing unit 15 comprising a waveform complex, similar to a phonocardiographic output or electrocardiographic output, which includes a multitude of signals. The output signals from mixer 15 are processed by a conditioning unit 16 including a bandpass filter having a frequency range anywhere, for example, between 100 cycles and 400 cycles, and a pulse shaper for providing Doppler pulses of a uniform pulse width as, for example, 180 ms. which is equivalent to about 5 ½ heartbeats per second. If desired, the bandpass filter output might be connected to an audio amplifier (not illustrated) for driving earphones or a recorder. The conditioning unit 16 is connected to four one shot multivibrator units 18, 19, 21 and 22 connected in cascade and each being triggered for a period of 5 ms. except for one shot unit 22 which is triggered for a period of approximately 44.68 ms.

A function generator 23 connected from one shot 22, is adapted to generate a hyperbolic function approximation having an RC exponential decay as illustrated in FIG. 2, to decrease from the maximum of 6 volts to, for example, 0.6 volts at one second. The function generator capacitance begins charging up at the leading edge of the signal generated by one shot unit 22 and is held at the 6 V potential until released at the trailing edge. The function generator is made so that each point along the hyperbolic curve is indicative of a potential value representing a selected heart rate on a beat-to-beat basis. This similar function may also be achieved by utilizing a digital counter. At the leading edge of the next successive pulse generated by one shot 22 the potential value to which the exponential curve has decayed will represent a heart rate value determined by the time duration between two consecutive leading edges of pulses generated by one shot 22.

Function generator 23 is connected to a sample and hold unit 24 via switch 24', thence to a sample and hold unit 25 via switch 25' and thence to a sample and hold unit 26 via switch 26'. Sample and hold unit 24 is also connected to a sample and hold unit 27 via switch 27', thence to a sample and hold unit 28 via switch 28', and thence to a sample and hold unit 29 via switch 29'. All three of the sample and hold units 27, 28 and 29 are connected through separate resistors to an output unit 31 which is provided to indicate an average of the signals held in sample and hold units 27, 28 and 29.

Sample and hold units 24 and 25 are further connected to a credence checker 32, and sample and hold units 25 and 26 are connected to a credence checker 33. The credence checkers 32 and 33 act as comparators in that they are adapted to produce an output if the difference between their inputs are separated by more than a predetermined allowable limit. An example of the credence checker unit is illustrated in FIG. 3 wherein resistors and 35 are adjustable to set the variable credence criteria selected. The input on lead 36 fed via resistors 34 might, for example, be from sample and hold unit 24 and the input on lead 27 fed via resistors 35 might, for example, be from the sample and hold unit 25. The inputs on leads 36 and 37 are compared at an operational amplifier 38. Should the input on lead 36 or V 36 fall outside the potential on lead 37 or V 37 by $\pm \Delta V$ where $\Delta V$ is the predetermined allowable limit, an output from amplifier 38 will appear across output load resistor 41. If V 36 is greater than V 37 + Δ V then transistor 39 will conduct, however, should V 36 be less than V 37 − Δ V, transistor 42 will conduct. In the present embodiment one might use, for example, the criteria of ± 20 beats per minute per beat as the predetermined allowable limit.

With reference back to FIG. 1, both credence checkers 32 and 33 are connected to a NOR gate 43 which is inhibited upon an output generated from either or both of the credence checkers. NOR gate 43, in turn, is connected to a gate 44, which is also connected from the one shot unit 22 in such a manner that gate 44, will only pass the output of one shot 22 in the absence of an output from NOR gate 43, or, in effect, in the absence of outputs from either of the credence checkers 33 or 32. The gate 44 output controls the switch 27' which is normally open at the input to sample and hold unit 27.

In a similar fashion switches 28' and 29' are respectively controlled by the outputs of one shot units 18 and 19. With reference back to NOR gate 43, this gate is also connected to a normally closed switch 45' which normally grounds an AC source, for example, the 60 cycle line input, being passed via resistor 46. Otherwise, with switch 45 open the AC source input will be fed via capacitance 47 via output unit 31, which will be fed to a recorder or other similar display unit.

OPERATION

With reference to FIGS. 1 and 4, typical processing circuitry will condition the Doppler signals to provide uniform duration pulses of, for example, 180 ms. in the present embodiment as is illustrated in FIG. 4-a. Accordingly, the leading edge of each alleged heartbeat signal will trigger one shot 18 to provide a 5 ms. output shown in FIG. 4-b which trailing edge in turn, generates a second 5 ms. signal from one shot 19 as shown at FIG. 4-c, again, its trailing edge generates yet a third 5 ms. pulse from one shot 21 as is illustrated at FIG. 4-d. The trailing edge of the pulse from one shot 21, in turn, triggers one shot 22 to generate a 44.68 ms. pulse causing at the leading edge, the capacitor of the function generator to charge up to the 6 volt level and be held at that level until the duration of the 44.68 ms. period. At the trailing edge of the one shot 22 pulse, the capacitor of the function generator 23 begins to discharge along the hyperbolic curve displayed in FIG. 2.

Upon occurrence of the next Doppler pulse or alleged heart-beat which generates yet another pulse at one shot 22, the function generator will again be charged up. However, during the 5 ms. period immediately preceding the second triggering of one shot 22, one shot 21 will close gate 24' causing the function generator to be sampled and providing a signal at the sample and hold unit 24. This signal represents a potential which is proportional to the heart rate on a beat-to-beat basis. In a similar manner, as one shot 18 and one shot 19 are triggered, sample and hold units 26 and 25 will accept signals being held at the sample and hold gates 25 and 24 respectively, as gates 26' and 25' are temporarily and consecutively closed.

The signals present in sample and hold units 24 and 25 are compared at credence checker 32, and similarly, the signals in the sample and hold units 26 and 25 are compared to the credence checker 33. Assuming the criteria at each of the credence checkers is not exceeded, no output, as represented at FIG. 4-f, will appear on the lead lines to the NOR gate 43 in which case NOR gate 43 will remain "on" to pass the pulse signal generated by one shot 22 through the gate 44 to close switch 27'. Upon the closing of switch 27' the signal from sample and hold unit 24 is received at the sample and hold unit 27. During the next cycle, the signal at sample and hold unit 27 is transferred to sample and hold unit 28 upon the triggering of one shot 19. In a similar manner, the sample and hold unit 29 will receive the signal from sample and hold unit 28 upon the triggering of one shot 18 during the next successive cycle. The signals in sample and hold units 27, 28 and 29 are added via their output resistors by an output unit 31 which is adapted to take the average of these three signals whereby the average signal is displayed on, for example, a chart recorder, a digital volt meter, or an analogue volt meter.

Assuming, for example, that as to any cardiac signal the credence checker 32 indicates that, for example, the beats per minute per beat might exceed 20 cycles positive or negative as is illustrated at FIG. 4-g, NOR gate 43 is inhibited (see FIG. 4-h). Gate 44 will therefore inhibit the pulse passing from one shot 22 (See FIG. 4-i) thereby leaving switch 27' in its normally opened position so as not to accept the signal from the sample and hold unit 24 since it has been indicated by credence checker 32 that this signal appears to be an inaccurate one. At the same time, at output unit 31 an indication will be had of the average of the signals only in the sample and hold units 28 and 29. To indicate that the predetermined credence criteria has not been met and that the average heart rate is made on the sample of two as opposed to three successive signals, the inhibiting of NOR gate 43 will also cause the normally closed switch 45 to be opened. In such circumstance, the AC source input which is normally grounded will be fed via capacitor 47 to the output unit 31. This additional output allows some of the AC source signal to be applied to the output causing the resultant pen and ink trace, in the case of a chart recorder, to be broadened to provide a visible indication of the fact that the measured instantaneous heart rate does not meet the credence critieria.

As may be observed from the above, this system requires at least three consecutive beats to be within the tolerance of the credence system before any input signal is allowed to be transferred to the output sample and hold unit 27. In addition, assuming an artifact signal does interrupt the flow of data to the sample and hold unit 27, at least the last previous piece of good information will be maintained and transferred through the remaining sample and hold units 27 and 28. At the same time, the recording trace is widened to indicate that new input signals are being rejected by the credence criteria. This, in effect, provides an average indication of, at least, the immediately previous heartbeat rate with further indication that successive heartbeat signals do not meet the credence criteria and that some problem may exist.

I claim

1. Apparatus for monitoring the heartbeat rate of a patient comprising:
   sensor means for deriving electrical signals representative of heartbeat activity;
   conversion means for generating from said electrical signals signal values representative of heart activity on a beat-to-beat basis;

means for continuously analyzing at least three successive signal values and for generating an output in comparing each a first and second one of said signal values and a second and third one of said signal values, falling within a predetermined frequency tolerance;

gate means responsive to the output of the comparison means for selectively passing signal values from said conversion means; and, output means for averaging the passed ones of three successive signal values to provide an output indicative of heartbeat rate.

2. Apparatus for monitoring the heartbeat rate of a patient comprising:

sensor means for deriving electrical signals representative of heartbeat activity;

conversion means for generating from said electrical signals signal values representative of heart activity on a beat-to-beat basis;

means for continuously analyzing at least three successive signal values by comparing a first and second one of said signal values and a second and third one of said signal values, within a predetermined frequency tolerance;

means for passing only said signal values falling within the frequency tolerance;

output means for averaging the passed signal values of three successive signal values to provide an output indicative of heartbeat; and, means for modifying the heartbeat rate during averaging three successive signal values if one of said signal values is not passed, to provide a visible indication.

3. Apparatus according to claim 1 wherein said conversion means includes a function generator for providing a signal value having a potential indicative of the rate of occurrence of the electrical signals on a beat-to-beat basis, and resetting means connected from said sensor means for resetting the function generator upon the presence of successive ones of said electrical signals.

4. Apparatus for determining the heartbeat rate of a patient comprising:

sensor means for deriving electrical signals representative of heartbeat activity;

conditioning means, for filtering said signals within a frequency range of substantially 100 Hz to 400 Hz and, for pulse shaping said electrical signals;

conversion means for translating said conditioned signals into values indicative of heart activity on a beat-to-beat basis;

comparison means for continuously comparing selective pairs from three successive ones of said values and for selectively generating an output in response to values lying within a preselected frequency tolerance; and gate means responsive the output of the comparison means for selectively passing signal values from the conversion means output means for averaging the passed values to provide an output indicative of heartbeat rate.

5. Apparatus according to claim 4 including:

means connected from said comparison means for modifying the heartbeat rate output to indicate the occurrence of signal values not passed by the gate means.

6. Apparatus according to claim 4 wherein said comparison means includes a first comparison means for comparing a first and second one of said values and a second comparison means for comparing a second and third one of said values.

* * * * *